(12) United States Patent
Powell et al.

(10) Patent No.: US 6,612,073 B1
(45) Date of Patent: Sep. 2, 2003

(54) INTENSIVE PLANT GROWING STACKING CONTAINER SYSTEM

(76) Inventors: Gregory S. Powell, 109 Calle Propano #B, Paso Robles, CA (US) 93446; Robin Marks, 548 Hill St., San Luis Obispo, CA (US) 93405

( * ) Notice: Subject to any disclaimer, the term of this patent is extended or adjusted under 35 U.S.C. 154(b) by 0 days.

(21) Appl. No.: 10/010,443

(22) Filed: Nov. 9, 2001

(51) Int. Cl.⁷ ................................................. A01G 9/02
(52) U.S. Cl. ............................ 47/83; 47/65.5; 47/82
(58) Field of Search ......................... 47/83, 65.5, 66.1, 47/66.5, 70, 79, 82, 86, 39, 41.01, 41.14; 248/128, 146

(56) References Cited

U.S. PATENT DOCUMENTS

| | | | | |
|---|---|---|---|---|
| 3,076,289 A | * | 2/1963 | Gallo | |
| 3,252,252 A | * | 5/1966 | Muelberger | |
| 3,452,475 A | | 7/1969 | Johnson, Sr. | |
| 3,686,791 A | * | 8/1972 | Mills | 47/83 |
| 4,419,843 A | | 12/1983 | Johnson, Sr. | |
| 4,614,056 A | * | 9/1986 | Farkas | 47/67 |
| 4,736,543 A | * | 4/1988 | von Bertrab Erdmann | 47/82 |
| 4,779,378 A | * | 10/1988 | Mason, Jr. | 47/83 |
| 5,309,671 A | * | 5/1994 | Byun | 47/71 |
| 5,363,594 A | | 11/1994 | Davis | |
| 5,404,672 A | * | 4/1995 | Sanderson | 47/39 |
| 5,428,922 A | | 7/1995 | Johnson | |
| 5,438,797 A | * | 8/1995 | Lendel | 47/39 |
| 5,440,836 A | * | 8/1995 | Lee | 47/59 R |
| 5,511,342 A | * | 4/1996 | Maso | 47/83 |
| 5,555,676 A | | 9/1996 | Lund | |
| 6,178,692 B1 | * | 1/2001 | Graven | 47/82 |

FOREIGN PATENT DOCUMENTS

| | | | | |
|---|---|---|---|---|
| DE | 3307428 A1 | * | 9/1984 | A01G/9/02 |
| DE | 3618833 A1 | * | 12/1987 | A01G/9/10 |
| EP | 0301362 | * | 7/1988 | A01G/9/02 |
| GB | 2173984 A | * | 10/1986 | A01G/9/02 |

* cited by examiner

Primary Examiner—Michael J. Carone
Assistant Examiner—Andrea M. Valenti

(57) ABSTRACT

A molded plant growing container system is easily stacked in a vertical array providing a self-supporting apparatus for intense horticulture. This apparatus increases crop yields over conventional growing methods. The containers nest within each other for ease of transport, are quickly and easily assembled, provide efficiency in installation and use of growing medium, increased numbers of plants in a given space, and are adaptable to a variety of irrigation methods.

13 Claims, 4 Drawing Sheets

INTENSIVE PLANT GROWING STACKING CONTAINER SYSTEM

CROSS-REFERENCE TO RELATED APPLICATIONS

Not applicable.

STATEMENT REGARDING FEDERALLY SPONSORED RESEARCH AND DEVELOPMENT

Not Applicable.

REFERENCE TO A MICROFICHE APPENDIX

Not Applicable.

BACKGROUND OF THE INVENTION

1. Field of the Invention

This invention relates to a plant growing medium container or receptacle with both commercial and home gardening plant husbandry uses. The invention allows control of the growing medium used for the plants, and it provides stability of a vertical array of the containers when stacked to increase plant yield in a given growing space. The containers are easily transported in a compact nested configuration, but are quickly and easily filled with growing medium and stacked for use.

2. Description of Related Art

Vertically arranged growing containers are found in the prior art. Recent examples are U.S. Pat. Nos. 5,555,676 (Lund), 5,428,922 (Johnson), and 5,363,594 (Davis). Such prior art containers or container systems present the user with a variety of difficulties making them unsuitable for commercial use and difficult for home gardeners to use. Some containers are of large size making transport difficult and time consuming, others have so many differing parts that transport and assembly is inefficient, others are inefficient in the process of loading growing medium into the container, requiring the container be filled while assembled in a stack, or a time-consuming multi-step filling process is required. Some containers are inefficient in the use of growing medium, requiring a substantial volume of growing medium or a relatively large footprint of ground to support only a relatively small growing area exposed to light. Others have no provision to preclude plants on one level from interfering with growth of plants on adjacent levels.

Recent restrictions or bans on use of certain chemicals used to improve commercial plant production have made it more desirable to have a vertical growing container that will allow control of a plant growing environment. An example is the current US Environmental Protection Agency phase-out of methyl bromide gas that is used as a broad-spectrum pesticide in the control of pest insects, nematodes, weeds, pathogens and rodents. The phase-out of the use of this gas began in 1999 and the present schedule is to completely stop use by the year 2005.

Methyl bromide is commonly used as a soil fumigant to effectively sterilize the soil before a crop of strawberries, tomatoes, or peppers is planted. Treatment with methyl bromide is a labor-intensive activity. The methyl bromide is injected into the soil at 12 to 24 inches depth, and then the soil is covered with plastic tarps to slow the evolution of the gas from the soil. Frequently the plastic tarps are left in place for the growing cycle of the crop.

With the phase-out of methyl bromide and restrictions on other chemical means of improving crop yield and quality, there is a need for a plant growing container system that is labor efficient and allows control of the growing medium, reducing or eliminating the need for pesticides. The intensive plant growing container system provides an added benefit in that the amount of water and labor required to grow many crops is reduced while the growing area is increased. It is estimated that strawberry growers using his stacking container system can quadruple the number of plants per acre and obtain increased yield from each plant because the plants are hanging and not exposed to the pests and mold that commonly damages crops laying on wet ground.

The advantages of this invention apply not only to commercial horticulture, but equally to home gardeners. Many home gardeners have need for an easy-to-use stacking container system for situations where there is limited space and limited time to prepare a garden.

SUMMARY OF THE INVENTION

Objects and Advantages

One object of this invention is to provide a plant growing container system that is labor-efficient in filling the containers with growing medium and assembling them into an apparatus for intensive horticulture. The single-piece container incorporates support protrusions that fit into support openings on the top of a second container giving vertical alignment and lateral stability and requiring no additional parts to assemble into a stack. The convenient size of the container allows quick filling by a single person. Once filled, the container support protrusions on the bottom are simply aligned with the support openings in the webs between the lobes on the second container and the second container is pressed into place. This process is quickly and easily repeated until a stack of containers filled with growing medium is obtained.

A second object of this invention is to provide a plant growing container system that is efficient in the use of growing medium when the container is used in a vertical stack of containers. The multi-lobed configuration of this invention, and the means of vertical alignment, provides an alternating lobe arrangement. Stacking the containers causes the lobes of one stacked container to be oriented between the lobes of the container above and the container below. The lobes contain the majority of the growing medium and therefore most of the growing medium is below a surface exposed to light and available for growing crops. The multi-lobed shape of the container also naturally separates plants from each other without requiring wasted growing medium in between the plants.

A third object of this invention is to provide a plant growing container system that is easily transported to the growing site and easily handled on the site. Each container is lightweight so it may be carried and manipulated with one hand. This light weight, and the ability of entire stacks of the containers to be nested and carried by a single person, makes for efficient shipping and transport to the growing site.

A fourth object of this invention is to provide a plant growing container system that is adaptable to numerous irrigation arrangements. Irrigation liquid may be introduced through tubing arranged up the center of a stack of containers, through tubing attached to the outer periphery of the containers, or by a completely external system, either rain or a system simulating rain. The container internals can provide for directing irrigation liquid in the container to the growing region, the outer lobed area of the container, and from this area the irrigation liquid can cascade from an upper container to successively lower containers through openings in the bottom of the container. Irrigation systems used with the container may be automated through use of soil moisture sensors and associated control systems.

A fifth object of this invention is to provide a plant growing container system that provides intensive horticulture that maximizes a crop yield of excellent quality. The rounded edge of the lobe section of the container allows crops that grow on a stem, such as strawberries, to hang from the container edge without damage to the stem. Crops grown hanging in this manner rather than lying on the wet ground are less susceptible to pests and molds associated with wet ground.

A sixth object of this invention is to provide a plant growing container system that provides intensive horticulture with labor efficient and crop-yield efficient harvesting of a crop. Any vertical arrangement of containers will allow harvesting a majority of the crop without having to bend down to reach the ground, providing labor efficient harvesting. The alternating lobe arrangement of this container system improves on this efficiency by producing a crop that is easily seen and therefore completely harvested, providing both labor and crop-yield efficient harvesting.

A seventh object of this invention is to provide a plant growing container system which may be manufactured at low cost and is durable so it may be used for multiple growing seasons, which will make use of this system economically desirable for both commercial growers and home gardeners. This plastic injection-molded article of unitary construction is also adaptable to other efficient manufacture processes.

BRIEF DESCRIPTION OF THE SEVERAL VIEWS OF THE DRAWINGS

A more complete understanding of the invention can be obtained by considering the detailed description in conjunction with the accompanying drawings, in which.

Reference Numerals in Drawings

Figure 1:
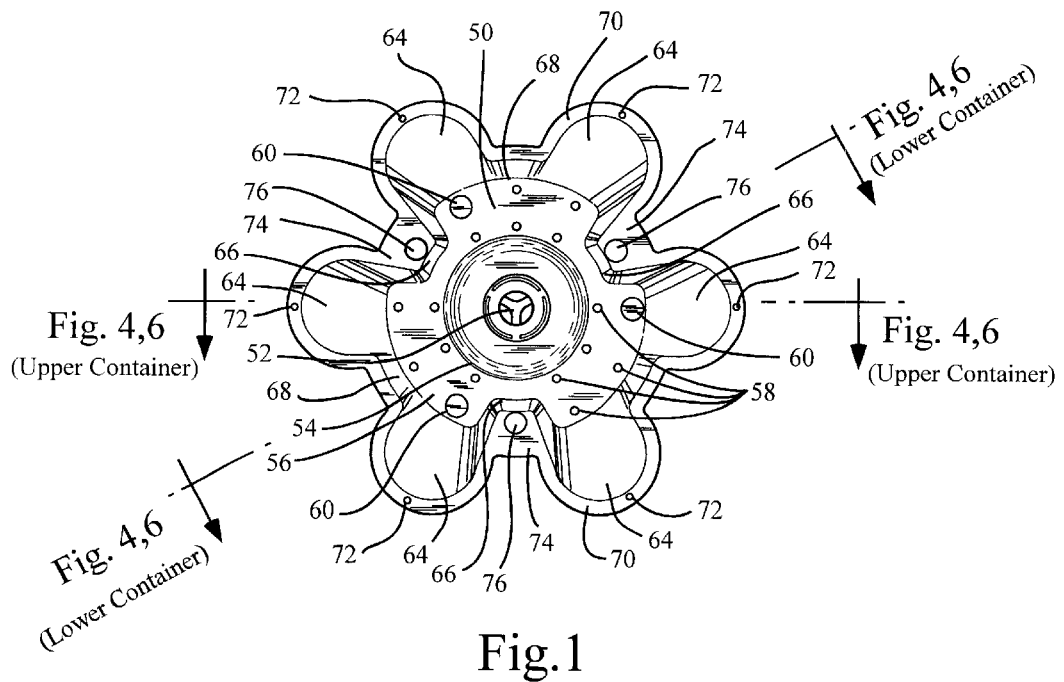
FIG. 1 is a top view of a single container of the container system. This figure also shows the cross-sections used for FIGS. 4 and 6. Two cross-sections are shown, one for the upper container and one for the bottom container. The upper container cross-section is shown on the top container and alternating containers in the stack on FIGS. 4 and 6. Similarly, the lower container cross-section is shown on the bottom container and alternating containers in the stack on FIGS. 4 and 6.

These reference numbers are used in the drawings to refer to areas or features of the one-piece growing container and parts that may be used in conjunction with a vertical array of the container system.

50. Bottom portion
52. Bottom portion center section
54. Bottom portion concentric sloping section
56. Bottom portion discontinuous ring section
58. Bottom-portion discontinuous ring section through openings
60. Bottom support protrusions
62. Container side portion
64. Container side portion lobe section
66. Container side portion discontinuity section
68. Container side portion nominal diameter section
70. Container side portion lobe top edge
72. Container side portion lobe top edge through opening
74. Container Support Web
76. Container support opening
78. Container stack internal irrigation tubing
80. Removable foot

DETAILED DESCRIPTION OF THE INVENTION

Preferred Embodiment

Figure 2:
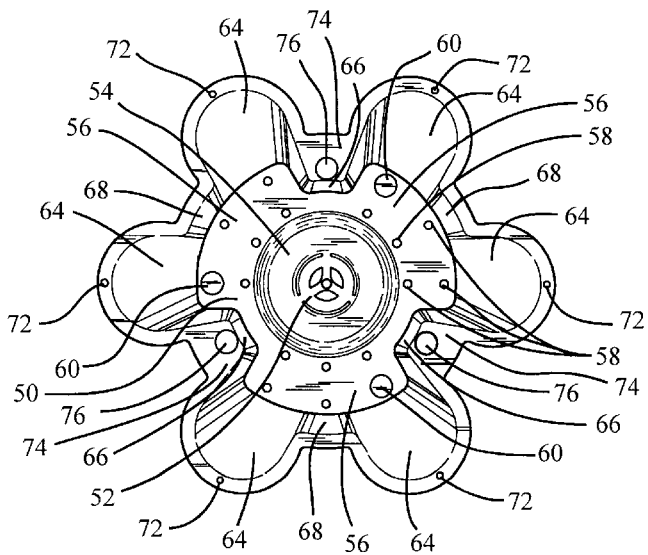
FIG. 2 is a bottom view of a single container of the container system.
Figure 3:
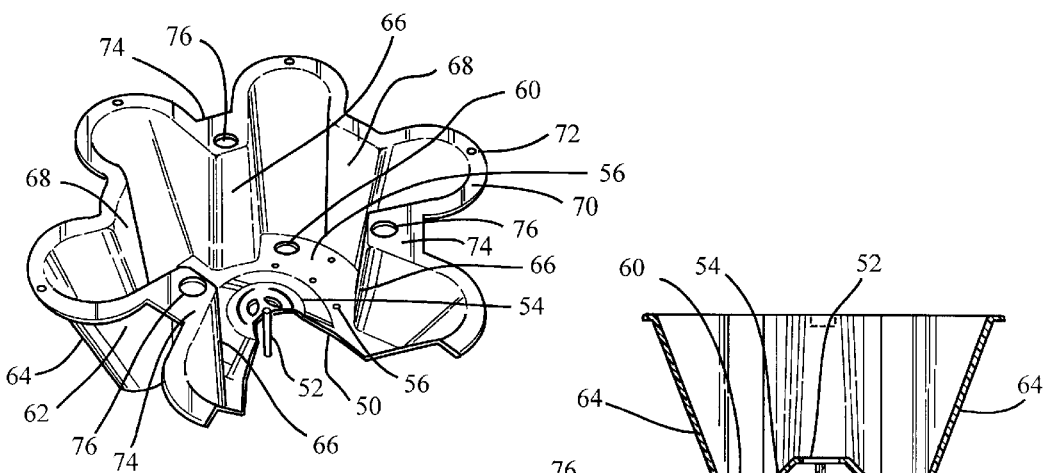
FIG. 3 is an isometric cutaway view of a single container of the container system illustrating the arrangement of an embodiment of the container bottom portion in which the bottom portion contains a removable center section and a concentric sloping section.
Figure 4:
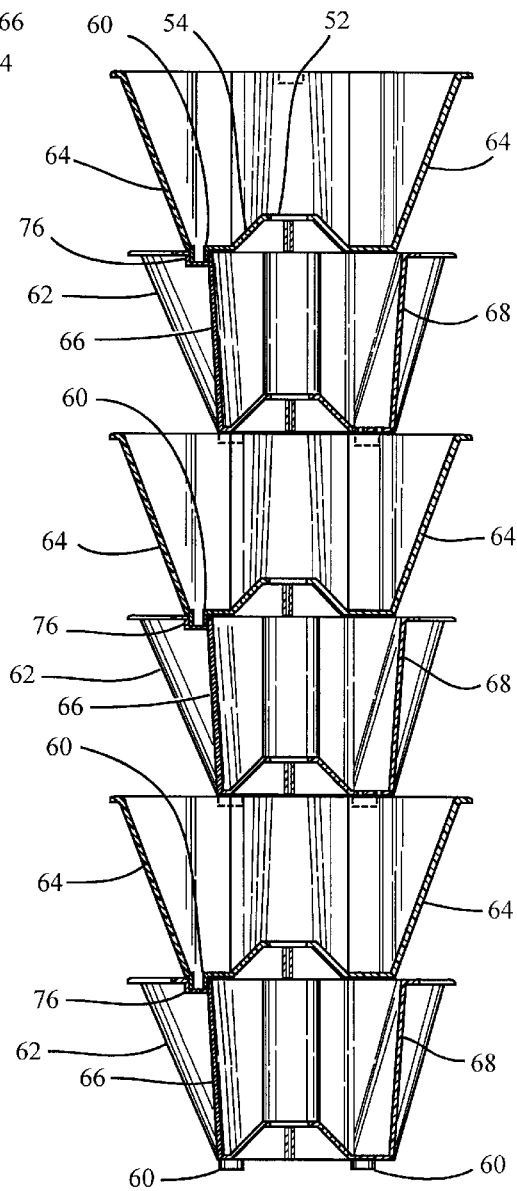
FIG. 4 is a cross section view of the container system in an array of 6-stacked containers. This figure shows how the stacked containers alternate position so the lobes of one container are located between the lobes of the container above and below. The cross-sections used for this figure are shown on FIG. 1.
Figure 5:
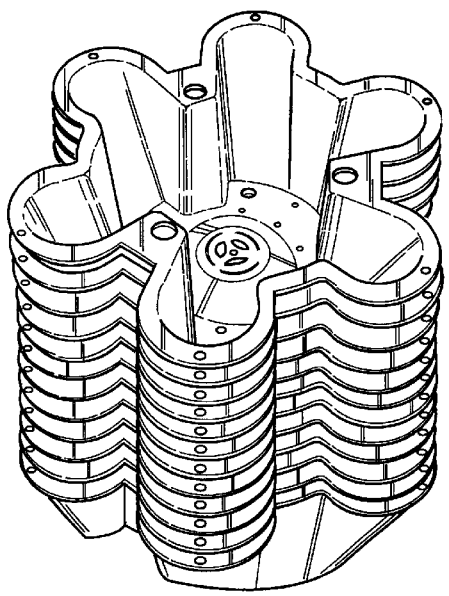
FIG. 5 is an isometric view of 12 containers nested one inside the other for transport.

FIGS. 1 through 5 show the preferred embodiment of the intensive plant growing container system. In this embodiment individual one-piece containers, as shown in FIGS. 1, 2, and 3, can be arranged in a vertical stack as shown in FIG. 4, yet may be nested together for shipping as shown in FIG. 5.

When stacked, the bottom support protrusions (60) of the lowest container rest on level ground and this container supports the containers above at the container support openings (76) in the container support webs (74). Both vertical and lateral support is provided to the upper container by the lower container support openings (76), by virtue of having a bottom support protrusion (60) of the upper container partially inserted in each lower container support opening.

The bottom support protrusions (60) are cast integral with the bottom portion discontinuous ring section (56). The protrusions are shaped similar to a sewing thimble with a tip, which may be flat or rounded, a sloping circular cross-section side section that increases in diameter with the distance from the tip. The protrusion cross-section in other embodiments may also be in any of a number of geometric shapes, for example elliptical or a polygon.

The protrusions have dimensions compatible with their insertion into the container support openings (76) on the container support webs (74). Referring to FIGS. 1 and 2, an imaginary circle might be drawn through the container support opening centers and the container bottom support protrusion centers. The spacing about this imaginary circle is the same for both the openings and the protrusions. This permits simultaneous insertion of all bottom support protrusions inside all the container support openings, fixing the azimuthal orientation of each upper container in relation to the lower container. This provides an apparatus of stacked containers, as shown in FIG. 4, with the protrusions of each upper container inserted in the openings of the next lower container, the lower container providing support to the apparatus, and defining the azimuthal orientation of each container so the lobes of one container are between the lobes of the other.

The protrusion walls are smooth, but the outer walls may contain grooves or projections used to anchor the protrusion in an opening or there may be a separate resilient part, such as an o-ring or sleeve, used to provide resistance to separation of the support protrusion inserted in the bottom protrusion opening.

In the preferred embodiment the bottom portion is substantially circular in shape with a center section (52) as shown in FIGS. 1, 2 and 3. Surrounding this center section is a concentric sloping section (54) that tapers away from the center section. This slope directs liquid in the bottom of the container to the level of the discontinuous ring section (56) that is lower than the level of the center section. The discontinuous ring section has several through openings (58) that permit liquid in the container to flow through the opening and drop into the next lower container. This provides cascading irrigation that allows the grower to only provide irrigation to the top container in a container apparatus consisting of a number of stacked containers.

The discontinuous ring section has an outer edge diameter with several discontinuities arranged symmetrically about the circumference as shown in FIGS. 1 and 2. The discontinuities are segments of the circumference with a smaller diameter outer edge, and they serve to allow spacing the support protrusion array centerlines in a circular array with the same centerline diameter as the container support-opening array.

The preferred embodiment container side portion, (62) in FIGS. 3 and 4, has 6 flared-lobe sections (64) as shown in FIGS. 1 and 2. The lobe sections are symmetrically spaced about the circumference of the container. More pairs of lobes, or non-symmetrical lobes, may be used to provide smaller lobe sizes in relation to the container size, in order to optimize the container for differing plant sizes. Each lobe flares outward with an increase in distance from the bottom portion. On one side of each lobe is a discontinuity section (66), the lower end of which is attached to the outer edge of one of the discontinuities in the bottom portion as shown in FIG. 3. The other side of each lobe is the nominal diameter section (68), the lower end of which is attached to the outside edge of the discontinuous ring section, as also shown in FIG. 3. Both the discontinuity section and the nominal diameter section increase in diameter as the distance from the bottom portion increases. The rate of increase in diameter with change in distance from the bottom is much smaller than the flare of the lobes, but it is sufficient to allow nesting of containers. In nesting containers, a substantial part of one container's outer side will fit inside a second container's inner side as shown in FIG. 5. Nesting allows for compact transport of multiple containers.

The container support web (74) is joined on three sides to the upper end of the side discontinuity section (66) and to the top edge (70) of two lobes, and it has a container support opening (76) as shown on FIGS. 1, 2, and 3. As previously noted, the discontinuity section in which the container support web is located has a smaller diameter at both the bottom portion and the side portion than the balance of the container allowing the bottom support protrusion array to have the same centerline diameter as the container support opening array, as shown on FIGS. 1 and 2. This like-centerline diameter allows stacking containers by inserting all the bottom support protrusions into the container support openings of the container below.

When stacked, as shown in FIG. 4, the arrangement of the upper and bottom protrusions orients the stacked container system such that the flared lobe sections (64) of one container side portion (62) is between the flares of the next higher and next lower container side portion. The container orientation alternates from the bottom to the top of the container system stack, as shown on FIG. 4.

The side portion lobe top edge (70) curves outwardly from the container to provide a curving plant stem support surface as shown in FIG. 4. This support surface is to minimize kinking of plant stems. This top edge may contain one or more through openings (72). These openings may be used to connect one stack of containers to another for additional horizontal stability, or to attach irrigation equipment.

Additional Embodiments

Figure 6:
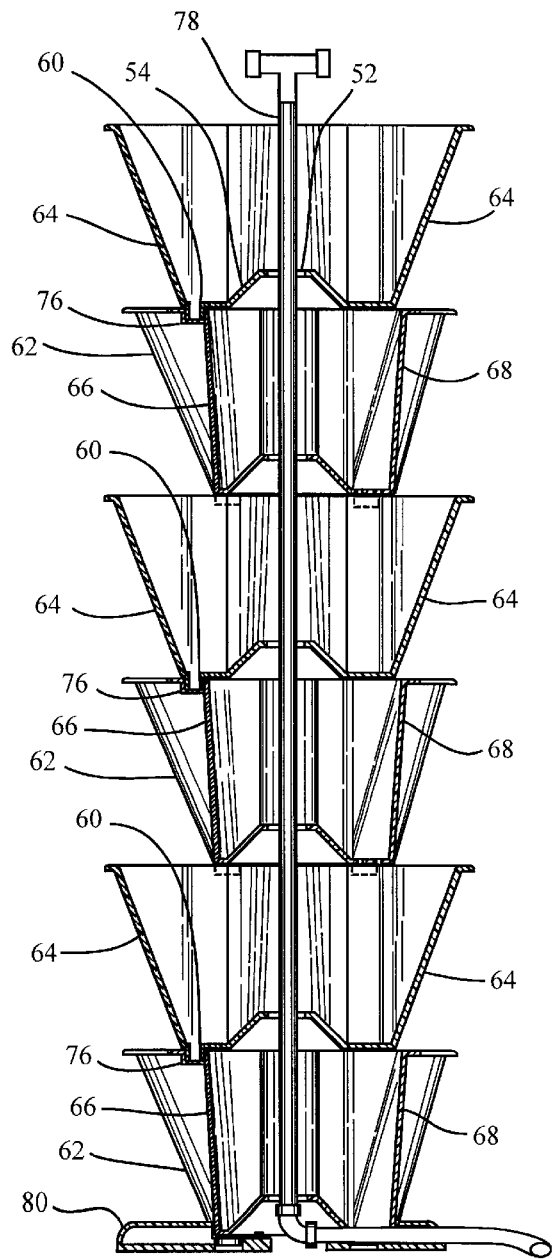
FIG. 6 is a cross-section view of the container system stacked in an array of six containers in an embodiment that has removable feet installed on the lowest container to provide additional stability, and with the bottom portion center section removed from each container to allow irrigation tubing to be installed in the center section of the apparatus so as to irrigate the top container. Similar to FIG. 4, this figure also shows how the stacked containers alternate position so the lobes of one container are located between the lobes of the container above and below. The cross-sections used for this figure are shown on FIG. 1.

One embodiment is to make the bottom portion center section removable as shown in the container stack in FIG. 6. The open center section allows the addition to the stack of an internal member that can act upon all the containers in the stack. Examples are the introduction of internal irrigation tubing or pipe (78) up the center of the apparatus to supply liquid to the uppermost container. FIG. 6 illustrates this. Excess liquid would then cascade down through the container discontinuous ring section through openings and eventually drip on the ground. Another example is the open center section could be used for additional lateral support for the entire apparatus by driving a stake into the ground that passes through the open center sections.

Figure 7:
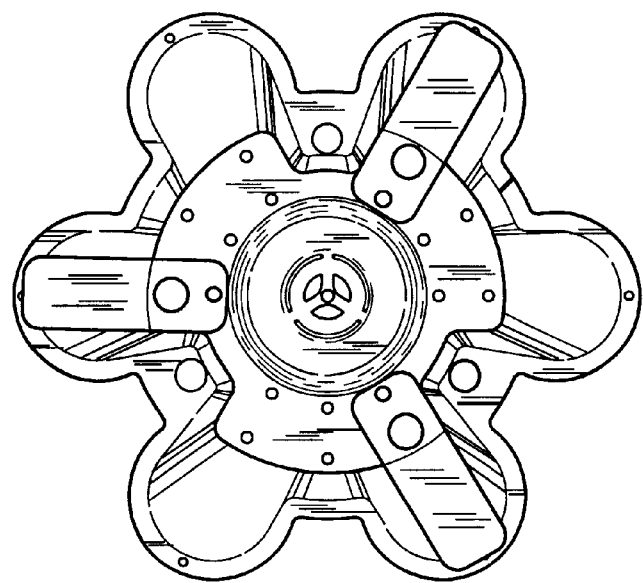
FIG. 7 is a bottom view of a single container of the container system with 3 feet installed on the bottom of the container.
Figure 8:
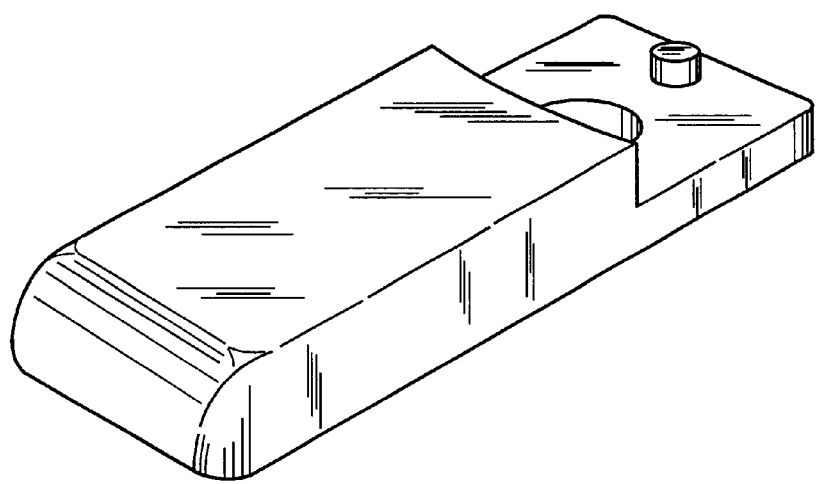
FIG. 8 is a view of a single removable foot.

Another embodiment is to assemble the lowest container in a stacked container apparatus on removable feet (80), as shown in FIG. 7. The removable feet provide additional resistance to tipping the apparatus.

Another embodiment is to support a stack of containers on a return flow box. If this were provided on a multitude of container stacks, this would permit a closed irrigation system that would save water and allow control of the chemistry of the liquid used for irrigation. This embodiment requires the return flow box include provision to accept the irrigation flow from the lowest container to collect in the box. The box would have provision for the excess liquid to return to a collection tank for reuse. This system could also employ moisture sensors and automatic controls for controlling the recirculation of liquid.

Operation

Operation of the intensive plant growing container system is a simple procedure easily performed by farm workers. A growing field would be leveled and a supply of growing medium prepared in piles or in containers and distributed about the level field. Supplies of the nested containers and removable feet, if needed, would be located with the growing medium. Container stack assembly starts with placing the removable feet, if used, on the base container, scoop growing medium into it, and place the filled container in position on the growing field. If desired, planting of the seed or seedlings may be done after positioning the container. Growing medium is then scooped into a second container, and the protrusions in its bottom aligned with the support openings in the initial container support web. The second container is then pressed into position on the base container; and then seeds or seedlings are planted, if desired. This process is repeated for a stack of containers as tall as desired, generally 4 to 6, and then another base container filled and positioned for the second stack. This process is repeated until the field is filled with container stacks in the desired array. The array needs to permit access for planting, if not done during assembly, for inspection, and for harvesting. Irrigation, if needed, is supplied either to the individual stacks or by a sprinkler system and the containers are then planted, if not already done, and irrigated.

We claim:

1. A stackable and nesting plant-growing container system comprising:
   a. a first container and a substantially identical second container, the first container and the second container each of plastic molded unitary construction and comprising a bottom portion, a side portion and a container support web,
   b. the bottom portion comprising a substantially flat circular center section with an upper surface and a lower surface surrounded by a concentric sloping section with an outer surface and an inner surface, the sloping section being surrounded by a concentric substantially circular, substantially flat, discontinuous ring section with an upper surface and a lower surface,
   c. the sloping section diameter increases as the distance from the center section increases such that liquid in the sloping section will collect in the discontinuous ring section,
   d. the discontinuous ring section comprising an outside edge which is substantially circular and a plurality of substantially identical discontinuities of substantially similar size arranged about the outside edge, each discontinuity having an outer edge that is smaller than the outside edge radial dimension,
   e. the discontinuous ring lower surface contains a plurality of bottom protrusions having a outer surface and an inner surface and positioned uniformly and centrally between the discontinuous ring discontinuities in a uniform radius between the outside edge radial dimension and the discontinuity outer edge radial dimension,
   f the bottom protrusion outer surface comprises a circular tip portion and a sloping side portion, the diameter of which uniformly increases as the distance from the lower surface increases,
   g. the container side portion comprises an inner side and an outer side, a top edge and a bottom edge, and is continuously joined at the bottom edge to the bottom portion outside edges and discontinuity outer edges such that the side portion inner side and bottom portion inner surface are in contact with and contain plant growing medium,
   h. the side portion inner and outer sides comprise a generally circular cross-section with a plurality of lobes extending from the circumference of that circle and arranged in pairs on both sides of the bottom portion discontinuities, such that each lobe has a discontinuity section adjacent to the lobe and on the opposite side of the lobe, a nominal diameter section,
   i. the lobe uniformly increases in diameter as the distance from the bottom portion increases and terminates in a top edge arranged with an outwardly curving inner side extending outside the container,
   j. the discontinuity sections and nominal diameter sections increase in diameter as the distance from the bottom portion increases at a lesser rate than the lobe, but at a sufficient rate such that a first container may be substantially inserted into a second container,
   k. the container support webs comprise an upper surface, a lower surface, and an outer edge, the webs arranged between the lobes at the side discontinuity sections and are continuously joined on three sides to the side portion top edge at the discontinuity sections and adjacent lobes,
   l. the container support webs each contain a support opening arranged to align with the bottom protrusions and sized such that all bottom protrusions may be simultaneously partially and removably inserted into a second container support openings such that the protrusions position and support the second container above the first container, and
   m. the locations of the protrusions position the lobe sections of the second container at the circumferential location of the discontinuity sections of the first container.

2. A stackable and nesting plant-growing container system as described in claim 1 further comprising the bottom portion discontinuous ring section upper and lower surfaces have a plurality of through openings arranged to permit liquid to flow from the second container to the first container.

3. A stackable and nesting plant-growing container system as described in claim 2, further comprising a plurality of containers removably supported in a container stack.

4. A stackable and nesting plant-growing container system as described in claim 3, further comprising the bottom portion center section is removable such that a variety of internal members may be inserted through the center sections to provide irrigation or additional lateral stability to a container stack.

5. A stackable and nesting plant-growing container system as described in claim 4, further comprising a through opening in each container side portion top edge arranged such that wire, cord or other fastener may be attached.

6. A stackable and nesting plant-growing container system as described in claim 5 further comprising a plurality of removable feet such that the feet resist tipping of the stack.

7. An apparatus for initensive horticulture comprising:
   a. a plurality of multi-lobed growing medium containers removably connected in a vertical array, each container of substantially identical construction comprising a bottom portion, a side portion and a plurality of container support webs,
   b. the bottom portion comprising a lower surface, an upper surface, and an outside edge, such that the lower surface supports the container, and the upper surface supports the contents of the container,
   c. the bottom portion further comprising a center section, a concentric sloping section and a discontinuous ring section, the center section removably attached for inserting a variety of internal members through the removed center section to provide irrigation or additional stability to a container stack,
   d. the bottom portion upper and lower surfaces further comprising a symmetrical array of bottom protrusions projecting from the lower surface and arranged near the bottom portion outside edge,
   e. the side portion continuously joined to the bottom portion outside edge and comprising an inner side, an outer side, an upper end, and a top edge, such that the side portion inner side and bottom portion upper surface are in contact with, and contain, a plant growing medium,
   f. the side portion inner and outer sides arranged with a plurality of lobes around the circumference, each lobe configured to flare out the container side with increasing distance form the bottom portion, the lobes terminating with and continuously joined to the top edge, and further comprising on one side of each lobes top edge, a discontinuity section between adjacent lobes and on the opposite side of each lobe top edge, a nominal diameter section between adjacent lobes, g. the nominal diameter section diameter increasing with distance from the bottom portion and terminating with and continuously joined to the top edge, h. the discontinuity section diameter increasing with distance from the bottom portion and terminating with the upper end continuously joined to one side of the container support web, i. the top edge arranged with an outwardly curving inner surface extending outside the container, and at the side of the lobes adjacent to the discontinuity section the top edge is continuously joined to the container support web, j. the container support web upper and lower surfaces contain an array of support openings arranged such that the support openings on the container support web upper surface of a first container will align with and allow partial entry of the array of bottom portion bottom protrusions of a second substantially identical container such that a second and a plurality of subsequent containers are in a vertical array supported vertically and laterally above the first container and aligned azimuthally such that the lobe sections of each container are azimuthally aligned at the discontinuity section of the container below, the configuration such that the containers may be filled will) the growing medium prior to being supported on the array, and k. the container is arranged with an increasing diameter of the side portion with distance from the bottom portion such that a second identical container fits in the first container such that the first container side inner surface contacts the second container outer surface substantially from the bottom to the upper rim.

8. An apparatus for intensive horticulture as described in claim 7 further comprising each container bottom portion center section and a concentric sloping section is section configured to slope from the elevation of the center section to a lower level with increasing distance from the center section, and surrounding the sloping section, a substantially flat discontinuous ring section with a plurality of through openings allowing liquid flow through the bottom section below the container such that excess liquid introduced to the top container of the apparatus will flow from the top container through each succeeding container to below the bottom container.

9. An apparatus for intensive horticulture as described in claim 8 further comprising a through opening in each side portion lobe top edge arranged to allow attaching wire, cord or other fastener.

10. An apparatus for intensive horticulture as described in claim 9 further comprising a plurality of removable feet attached to the lowest container of the vertical array such that the removable feet resist tipping apparatus.

11. A plant-growing container comprising:

a. an inside surface and an outside surface, each surface having a bottom, a side and an upper rim portion such that the bottom and side inside surface form a container, b. the bottom portion containing a plurality of bottom support protrusions, and the upper rim portion containing a plurality of container support openings such that the first container bottom portion support protrusions will insert into a second container upper rim portion support openings, such that the containers are fixed relative to each other in the vertical, horizontal and azimuthal directions, c. the side portion is shaped to form a multiplicity of lobes arranged in relation to the support protrusions and openings such that the insertion of the bottom support protrusions into the support openings azimuthally aligns the lobes of a first container between the lobes of a second container, d. the bottom support protrusions are arranged such that a container filled with growing medium will stably insert into the container support openings of a second container filled with growing medium, e. the azimuthal alignment arranges the surface of the growing medium in the lobes of each container such that it is exposed to light and available for growing crops, and f. the side portion diameter increases with distance from the bottom portion such that when the lobes of a first empty container are aligned with the lobes of a second empty container the second container fits within the first container such that the first container side inner surface contacts the second container outer surface substantially from the bottom to the upper rim;

g. the bottom portion further comprising a center section, a concentric sloping section and a discontinuous ring section, the center section removably attached for inserting a variety of internal members through the removed center section to provide irrigation or additional stability to a container stack.

12. A plant-growing container as described in claim 11 further comprising the upper rim portion contains means to attach wire, cord or other fastener, such that any one of a plurality of containers arranged in a fixed configuration by the bottom protrusions may have wire, cord, or other fastener attached to the rim.

13. A plant growing container as described in claim 12 further comprising a plurality of removable feet attached to the container bottom outside surface such that the feet resist tipping of the container, the removable feet configured such that they may be stored and transported within the container.

* * * * *

UNITED STATES PATENT AND TRADEMARK OFFICE
CERTIFICATE OF CORRECTION

PATENT NO. : 6,612,073 B1
DATED : September 2, 2003
INVENTOR(S) : Gregory S. Powell and Robin Marks It is certified that error appears in the above-identified patent and that said Letters Patent is hereby corrected as shown below:

Column 9,
Line 33, change "will)" to -- with --
Line 43, cancel "center section and a"; cancel 3rd "section"

Signed and Sealed this

Twenty-fourth Day of February, 2004

JON W. DUDAS
*Acting Director of the United States Patent and Trademark Office*